(12) United States Patent
Christiansen et al.

(10) Patent No.: US 7,144,437 B2
(45) Date of Patent: Dec. 5, 2006

(54) VERTICALLY ARRANGED SEPARATOR FOR SEPARATING LIQUID FROM A GAS FLOW

(76) Inventors: Bjorn Christiansen, Porsmyra 17, N-7091 Trondheim (NO); Knur Sveberg, Nordslettveien 8C, N-7038 Trondheim (NO); Inge Hjelkrem, Elgesetergate 58A, N-7030 Trondheim (NO); Dag Kvamsdal, Nedre Bakklandet 26C, N-7012 Trondheim (NO)

( * ) Notice: Subject to any disclaimer, the term of this patent is extended or adjusted under 35 U.S.C. 154(b) by 286 days.

(21) Appl. No.: 10/491,896

(22) PCT Filed: Oct. 18, 2002

(86) PCT No.: PCT/NO02/00379

§ 371 (c)(1),
(2), (4) Date: Jun. 9, 2004

(87) PCT Pub. No.: WO03/033106

PCT Pub. Date: Apr. 24, 2003

(65) Prior Publication Data

US 2005/0011170 A1     Jan. 20, 2005

(30) Foreign Application Priority Data

Oct. 18, 2001   (NO) .................................. 20015056

(51) Int. Cl.
*B01D 45/12*    (2006.01)
(52) U.S. Cl. ........................... 55/343; 55/347; 55/348; 55/457; 55/466

(58) Field of Classification Search .................. 55/343, 55/345, 347, 348, 457, 466
See application file for complete search history.

(56) References Cited

U.S. PATENT DOCUMENTS

| 2,553,175 A | * | 5/1951 | Davenport et al. ........... 55/343 |
| 3,769,781 A | | 11/1973 | Klein et al. |
| 4,015,960 A | | 4/1977 | Nutter |
| 4,767,424 A | | 8/1988 | McEwan |
| 5,129,124 A | | 7/1992 | Gamon et al. |

FOREIGN PATENT DOCUMENTS

| GB | 1232556 | 5/1971 |
| WO | 0025931 | 5/2000 |

* cited by examiner

*Primary Examiner*—Robert A. Hopkins
(74) *Attorney, Agent, or Firm*—Dennison, Schultz & MacDonald

(57) ABSTRACT

A vertically oriented separator for separating liquid from a gas stream, where the incoming fluid enters the separator through an inlet nozzle arranged mainly perpendicular to the center axis of the separator and communicates with a circular swirl-inducing inlet device which is outwardly limited by the separator wall, inwardly limited by a mainly centrally arranged pipe and upwardly limited by a sealed top cover. The separator includes a first separation compartment arranged below the pipe and a second separator compartment arranged above the pipe, so the incoming fluid successively and under continuous swirl is forced to pass from the circular swirl-inducing inlet device to the first separator compartment and further through the pipe to the second separator compartment.

5 Claims, 5 Drawing Sheets

Figure 3:
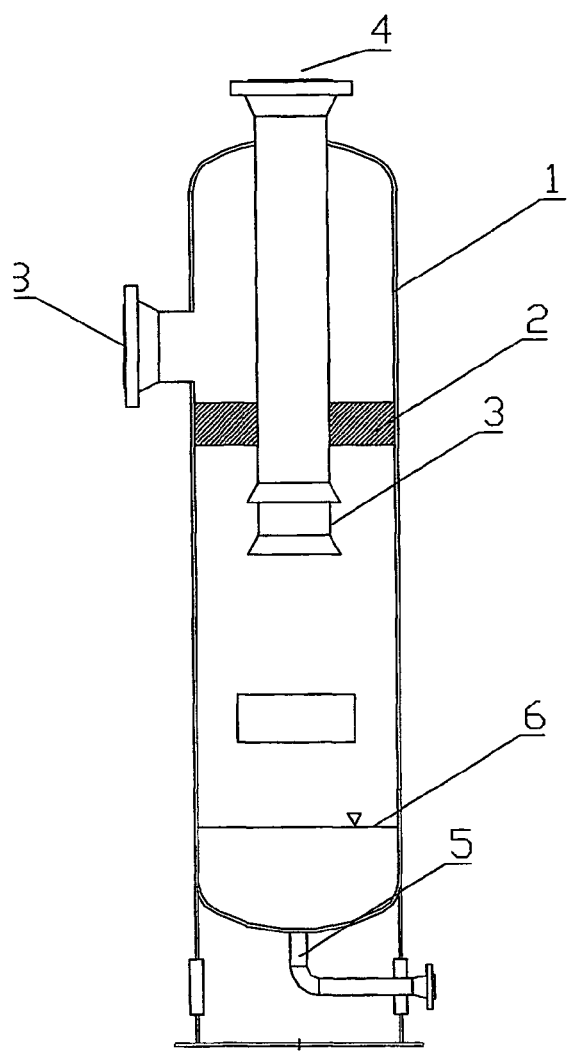

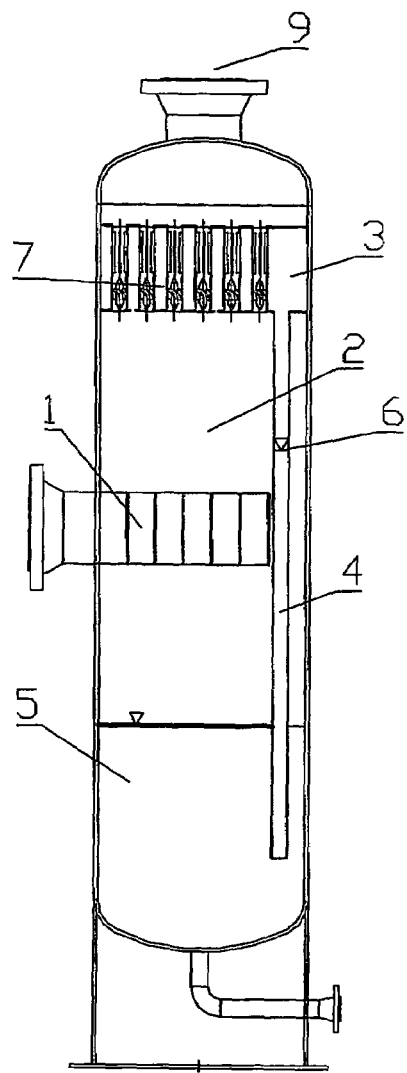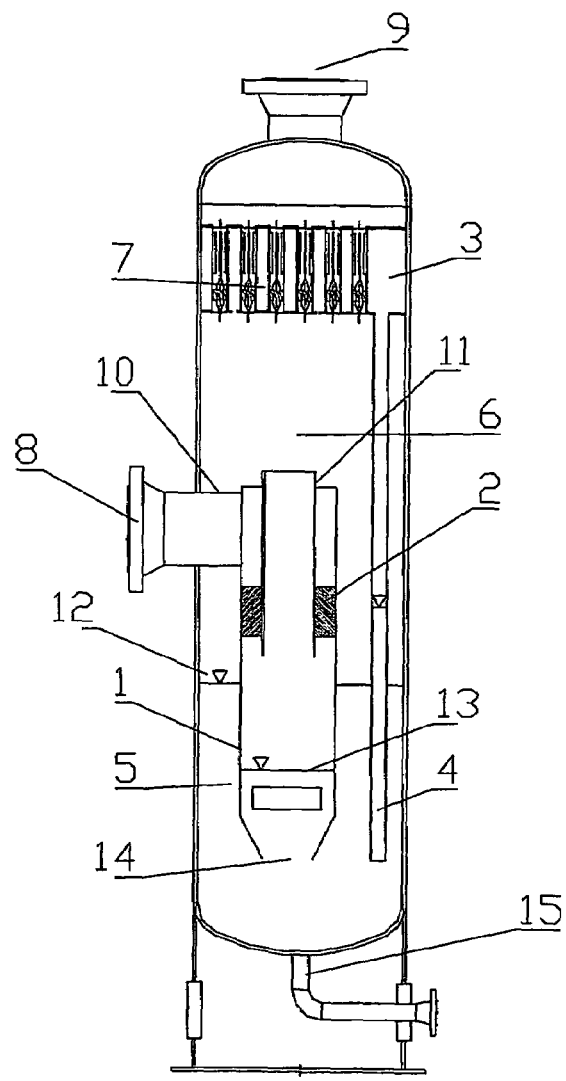
Fig. 1
Fig. 2

VERTICALLY ARRANGED SEPARATOR FOR SEPARATING LIQUID FROM A GAS FLOW

This is a 371 of PCT/NO02/00379, filed on Oct. 18, 2002.

INTRODUCTION

The present invention relates to separation of liquid droplet from a gas stream, particularly in production of oil and gas. More precisely, the present invention relates to a vertically oriented separator for removal of liquid droplets from a gas stream.

BACKGROUND

During production of oil and gas from a subterranean reservoir, the well stream will normally contain oil, gas, water and some solid particles. In order to separate the various fluids and solids, a dedicated process system for the well stream is constructed. The separation is made in several stages, where the "bulk separation" of the various phases is carried out by gravity forces alone, and the "fine separation" or purification is mainly utilising centrifugal forces and inertial forces together with the gravity force. A major challenge appearing in most separation stages is to remove liquid droplets from a gas stream where the liquid content in the gas is low, typically less than 1 vol % of the total volumetric flow. It is of outmost importance to remove most of this liquid in order to protect downstream equipment such as compressors and additional dewatering equipment. This is done in large separators, horizontally or vertically oriented. In the following, separators dedicated to separate gas/liquid mixtures containing less than said 2 vol % liquid are denoted gas scrubbers. This denotation also comprises contactor towers used for removing vapour from a gas stream, where the lowermost and the uppermost parts of the contactor tower are used to remove liquid droplets from the gas stream.

In gas scrubbers, the separation takes place in several stages. First, the gas enters through an inlet nozzle, which—for vertical oriented scrubbers—may be located approximately at the middle of the scrubber in its vertical direction. At the inlet nozzle a momentum breaker plate, a vane diffuser or any device may be arranged in order to distribute fluids across the separator cross-sectional area. Already here, the largest drops are separated and fall down onto the liquid reservoir in the lower part of the separator.

The gas flows upwards into a calm zone, or deposition zone, where further droplets due to gravity fall down onto the liquid surface below, alternatively first deposit on the separator wall and thereafter drain downwards on the wall.

Close to the top of the separator, the gas is made to pass through droplet separation equipment of known technology. There are mainly three categories of droplet separation equipment; mesh pad, vanepack and axial flow cyclones arranged in parallel. Because of the pressure drop across the droplet separation equipment, the separated liquid is normally drained down to the liquid 4reservoir through a drain pipe, the lower end of which is submerged in the liquid reservoir. It is important that the drain pipe cross-sectional area is sufficient large to allow liquid to coalesce in the drain pipe. If the drain pipe diameter is too small, foam might build up in the drain pipe causing separated liquid not to drain sufficiently, but rather follow the gas.

It is important that the separator inlet device is correctly designed in relation to the separator cross-sectional area in order to remove as much liquid as possible, in order to avoid overloading the demisting equipment. This is particularly important for vertical scrubbers and contactor columns utilised to remove aqueous vapour from a gas stream. Too much liquid fed to the demisting equipment due to poorly designed inlet devices and/or too small scrubber diameters relative to the gas flowrates are the main reasons for malfunction experienced on a large number of scrubber installations. This is due to the fact that vertical scrubbers utilise inlet devices of known technology, where gravity forces alone is used to separate liquid in the scrubber inlet compartment, which sets stringent limits to acceptable gas velocities, above which considerable amounts of liquid is following the gas to the demisting equipment. Inlet cyclones have successfully replaced earlier used inlet devices in modern 2- and 3-phase separators where the liquid content is high, typically above 5 vol %, while inlet devices denoted as vane diffusers still represent state of the art technology in vertical gas scrubbers where the liquid fraction is less than 2 vol %. Lately, cyclone inlet devices are also applied in gas scrubbers. However, some operational problems associated with cyclone inlet devices used in gas scrubbers will be explained in the following.

OBJECTIVE

The object of the present invention is to provide a vertical gas scrubber suited for separation of relatively small volumetric amounts of liquid from gas streams, with better separation efficiency than state of the art technology.

INVENTION

The present invention comprises a vertical separator for removing liquid droplets from a gas stream, the separator being characterised by the features defined in claim 1.

According to the invention, the inlet fluid is set in rotation by means of a swirl-inducing device which is outwardly delimited by the separator wall, inwardly delimited by a mainly centrally arranged pipe and upwardly delimited by a sealed top cover, ensuring that the incoming fluid is exposed to a centrifugal force in addition to the gravity force. Most of the liquid will, due to the centrifugal force, be separated immediately towards the separator wall and drained towards the liquid surface by gravity. Such an arrangement alone is according to known technology, normally denoted as a cyclonic separator.

According to the present invention further droplet removal in one or two subsequent stages is conducted, both of which arranged within the separator, where the final stage utilises one or more axial flow cyclones arranged in parallel. The combination of a swirl-inducing inlet device and final droplet removal by axial flow cyclones, results in unique advantages in vertical separators, since they thereby are able to remove liquid from the gas stream more efficiently than what has been possible hitherto. In addition the negative operational- and mechanical disadvantages during operation of inlet cyclones of known technology are eliminated.

In the following the invention, and for comparison also embodiments of known technology, is further described with reference to drawings.

DRAWINGS

Figure 4:
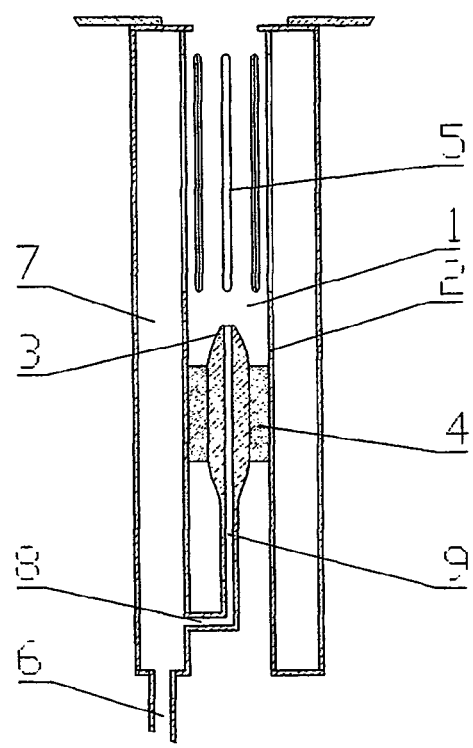
Figure 5A:
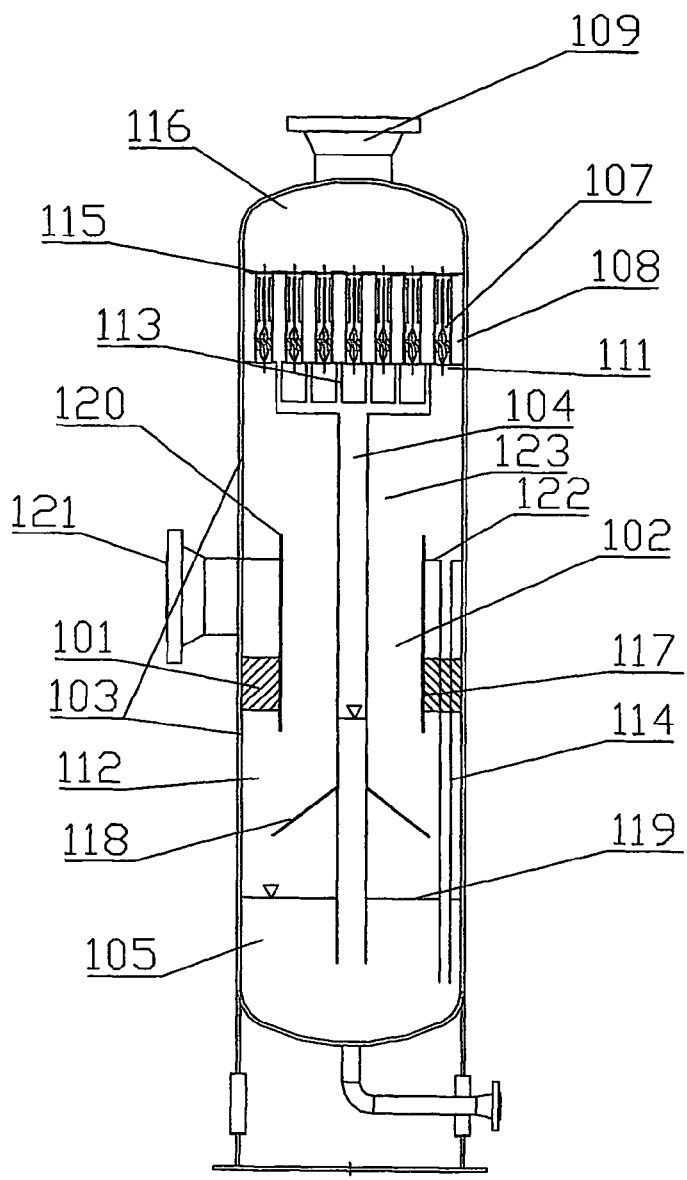
Figure 5B:
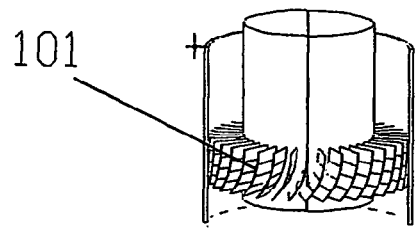
Figure 6A:
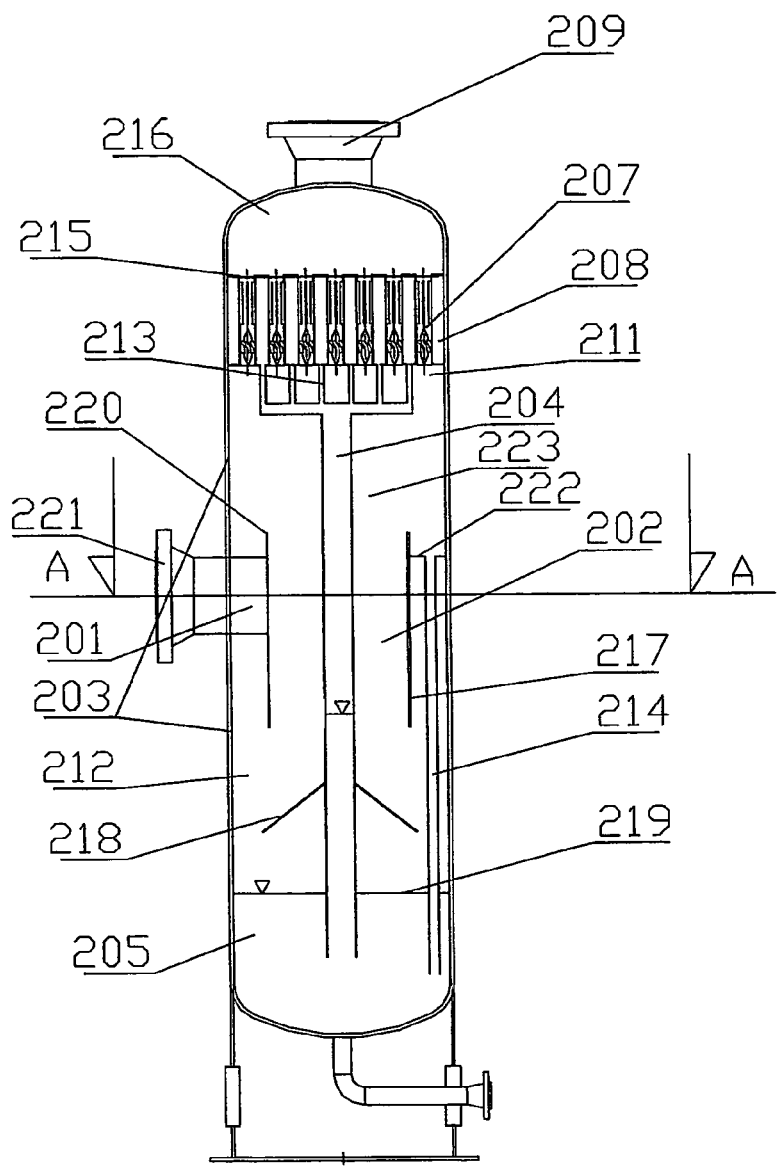
Figure 6B:
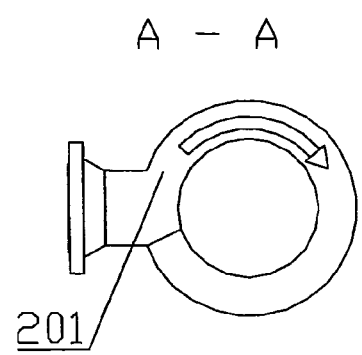
Figure 6C:
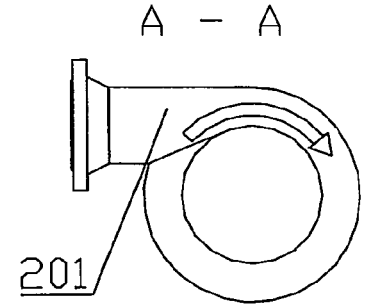
Figure 7:
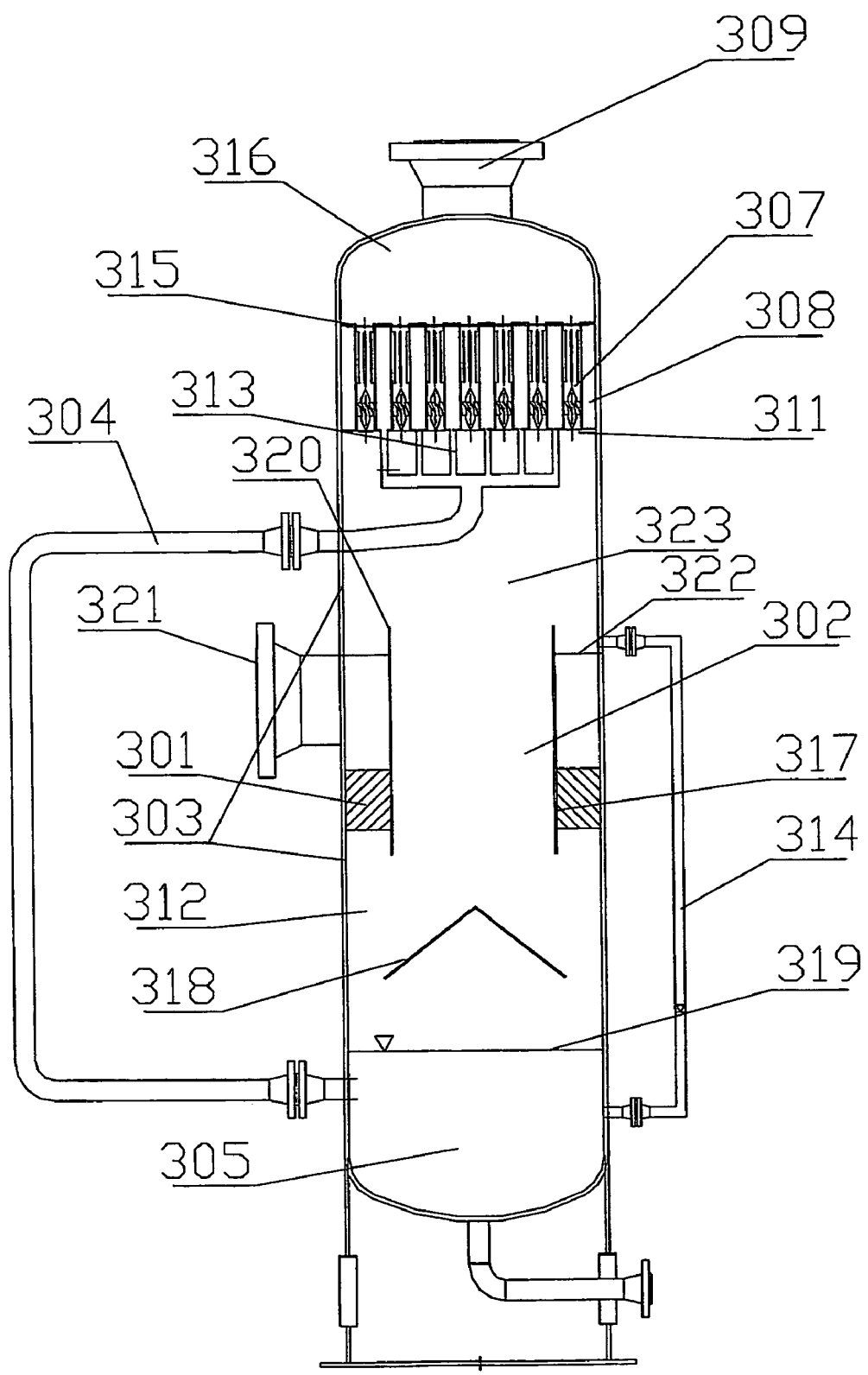

FIG. 1 is a cross-sectional view of formerly known gas scrubber equipped with a vane diffuser inlet device, demisting equipment and internal drain pipe, FIG. 2 is a cross sectional view of formerly known gas scrubber equipped with a cyclonic inlet device, demisting equipment and internal drain pipe, FIG. 3 is a cross sectional view of a formerly known single-stage cyclonic scrubber, FIG. 4 is a cross-sectional view of a formerly known axial flow cyclone, FIGS. 5a–b are cross sectional views of a first embodiment of the invention on how axial flow cyclones in combination with a swirl-inducing inlet can be arranged in a vertical scrubber, FIGS. 6a–c are cross sectional views of a second embodiment of the invention on how axial flow cyclones in combination with a swirl-inducing inlet can be arranged in a vertical scrubber, FIG. 7 is a cross sectional view of a third embodiment of the invention on how axial flow cyclones in combination with a swirl-inducing inlet can be arranged in a vertical scrubber.

FIG. 1 shows a separator according to known technology, comprising a vane diffuser inlet device 1 receiving and distributing the inlet gas from the inlet nozzle 8 as gentle as possible and guiding the gas into the deposition zone 2. The deposition zone is normally relatively small, resulting in limited amounts of droplets being separated by gravity. It is therefore preferable to design the inlet device 1 so it knocks out most of the liquid immediately when the liquid enters the separator. This is not the case for inlet devices as momentum breakers or vane diffuser inlets. Vane diffuser inlet devices still represent state of the art inlet device technology in gas scrubbers where the liquid fraction is typically less than said 2 vol %.

Gas passing through the deposition zone 2 contains many small and some medium size droplets when entering the demisting equipment 7, here illustrated as axial flow cyclones, where further amounts of liquid are separated. Liquid separated by the demisting equipment 7 is collected in the chamber 3, and then drained through the drain pipe 4. As earlier explained, the pressure on the downstream side of the axial flow cyclones will be lower than the pressure upstream the axial flow cyclones, and therefore the drain pipe 4 has to be submerged in the liquid 5 to avoid gas flowing counter current with the liquid in the drain pipe 4. The liquid column in the drain pipe 4 balances this sub-pressure in the chamber 3. The liquid level 6 in the drain pipe 4 will therefore be higher than the liquid level in bottom compartment 5 of the scrubber, and the available height above the liquid surface 6 is a key parameter with respect to dimensioning the gas scrubber. At too high gas flow rates relatively to the scrubber height, liquid will be sucked up into the chamber 3 and further into the gas outlet 9.

FIG. 2 is a cross sectional view of a formerly known gas scrubber equipped with a cyclonic inlet device, demisting equipment and an internal drain pipe as described e.g. in UK patent application GB2329857. This configuration is characterised by the connection between the inlet nozzle and one or more cyclones through one or more distribution pipes 10. The cyclone tube has a swirl-inducing device 2 in order to set the incoming fluid in rotation inside the cyclone tube 1. In FIG. 2, the swirl-inducing device 2 is shown as a vane cascade. Most of the liquid is separated in the cyclone tube 1 by means of centrifugal forces downstream of the vane cascade 2, whereafter the rotating gas leaves the cyclone tube through a gas outlet pipe 11. Further droplet removal is conducted in axial flow cyclones 7 close to the scrubber gas outlet 9, where separated liquid is drained through one or more drain pipes 4 as earlier described. Liquid separated in the cyclone tube 1 drains along the inner wall of the cyclone tube 1, and is guided through the liquid outlet of the cyclone 14. The liquid level 12 in the separator is measured and normally controlled by a valve on the separator liquid outlet 15.

A substantial disadvantage by utilising this kind of cyclonic inlets is the risk of gas breakthrough in the cyclone tube liquid outlet 14. Because of the pressure drop from outlet of the vane cascade 2 to the top of the vortex finder of the gas outlet 11, the pressure at the liquid surface 13 inside the cyclone will be higher than the pressure at the liquid surface 12 in the separators deposition zone 6. If the pressure drop is too high, the liquid surface 13 inside the cyclone tube will be forced down to the cyclone tube liquid outlet 14, and gas will be blown out of the liquid outlet, causing foaming and subsequently liquid entrainment to the scrubber gas outlet nozzle. From this situation, the whole scrubber can "collapse". The pressure drop across the gas outlet is caused by the velocity increase when the gas passes the vane cascade 2 outlet to the gas outlet 11. The velocity increase has two reasons; i) the gas gets a high axial velocity when it is forced through the gas outlet pipe 11, and ii) the rotational component of the gas will, due to conservation of rotational momentum increase because the gas is forced into a smaller diameter. The latter effect explains why the "ice-ballerina" increases her rotational velocity when she pulls her arms towards her body. According to the law of conservation of momentum (Bernoulli's equation), the total velocity increase will thus require a pressure drop (pressure in deposition zone 6 is lower than the pressure inside the cyclone tube 1). Increased gas flow rate thus gives increased total velocity and consequently increased pressure drop.

Another disadvantage by utilising this kind of cyclonic inlet device is the practical arrangement of the distributing pipe 10, particularly in cases where the separator internals have to be replaceable. In those cases a bolted connection has to be made between the distribution pipe, the separator wall and the cyclone tubes, causing limitations to the cyclone tube diameter and/or numbers of cyclone tubes that can fit into the vessel. If the cyclone tube does not have to be replaceable, the distribution pipe 10, which then should be cylindrical, is welded to the separator wall prior to attachment by welding of the inlet nozzle 8.

FIG. 3 is a cross sectional view of formerly known single-stage cyclone-separator, which for instance is described in Norwegian patent NO175569. Such a configuration is characterised by that the liquid separation takes place in one single stage, and that the pressure vessel represents the cyclone tube. Principally, the cyclone separator shown in FIG. 3 is identical with the inlet cyclone shown in FIG. 2. The cyclonic separator 1 has a swirl-inducing device 2 to set the incoming fluid in swirling motion. In FIG. 3, the swirl-inducing device 2 is shown with a vane cascade. Most of the liquid is separated in the cyclone separator by centrifugal forces downstream of the vane cascade 2, whereafter the rotating gas leaves the separator through the gas outlet 3, which is directly connected to the gas outlet 4 of the separator. No further droplet removal is made. Liquid separated in the cyclone separator 1 is drained along the cyclone separator's inner wall and allowed to leave the cyclone separator through liquid outlet nozzle 5. The advantage with such an arrangement compared to inlet cyclones is the elimination of problems related to gas breakthrough because liquid level 6 in the cyclone separator is directly measured and controlled. The disadvantage with the arrangement is less separation efficiency as downstream droplet removal equipment is not present.

FIG. 4 shows an example of an axial flowing cyclone of known category, i.a described in patent applications PCT/NL97/00350, PCT/NL99/00677 and NL20001016114. The notion axial cyclone defines that the gas transport velocity is mainly taking place in the longitudinal direction of the cyclone and that at least one swirl-inducing element is arranged opposite to the outlet, and that slots or perforations in parts of the cyclone tube are present in order to allow separated liquid to drain out of the tube. Axial flow cyclones have lately been dominating within high-pressure demisting applications because their pressure drop is lower than for so-called reverse flow cyclones. The example of an axial flow cyclone shown in FIG. 4, comprises a cylindrical pipe 2 through which the gas is passing. Inside the pipe a vane cascade is arranged comprising an axis-symmetric concentric body with vanes 4 giving the gas stream a rotational velocity component when it passes through the separation chamber 1. The concentric body of the vane cascade 3 has a central longitudinal flow passage 9. Due to the gas rotational motion, liquid droplets will due to their higher density be forced towards the wall of the cyclone tube 2. Due to the gas velocity, the liquid film deposited on the wall will only to a small extent be able to drain downwards along the wall, and will instead be lead out through the cyclone wall 2 through slots 5 arranged in the upper end of the tube walls and out to a drainage chamber 7 where the liquid is collected and drained through the drain pipe 6 to the liquid section of the separator. In order to aid the liquid passing though the slots 5, a gas purge stream is normally established to give a net flux of gas through the slots in same direction as the liquid. This is obtained by connecting the drainage chamber 7 to the low-pressure area in centre of the cyclone pipe 2, through a channel 8 connected to the central flow passage 9 in the swirl element 3. This purge gas is typically 2–10% of the total gas flow. As understood from FIG. 4, the purge gas represents a loop from the separation chamber 1 out to the drainage chamber 7 and back to the separation chamber 1.

FIGS. 5, 6, and 7 shows according to the present invention three examples on how the swirl-inducing inlet device in combination with axial flow cyclones can be arranged in vertical separators. The gas enters the separator through an inlet nozzle 121, 221, 321 arranged mainly perpendicular to the centre axis of the separator in communication with a circular swirl-inducing inlet device 101, 201, 301 being outwardly limited by the separator wall 103, 203, 303, inwardly limited by a mainly centrally arranged pipe 117, 217, 317 and upwardly limited by a sealed top cover 122, 222, 322. The swirl-inducing inlet device may preferably have vanes as shown in FIGS. 5*a*–*b* or have a single tangential inlet path 201 as shown in FIGS. 6*a*–*c*. The gas containing liquid droplets is forced into a swirling motion guided downwards to the first compartment of the separator 112, 212, 312, below the inlet device 101, 201, 301 and above the liquid compartment 105, 205, 305, where bulk liquid and large and medium sized droplets are deposited on the wall 103, 203, 303 and further drained downwards to the liquid surface 119, 219, 319 whereafter the swirling gas still containing some liquid droplets is turned upwards through a preferably concentrically arranged tube 117, 217, 317. Such an inlet device alone is according to known technology described for instance in Norwegian patent NO 175596. However, in this patent no further separation of the gas is carried out as the central pipe is communicating directly with the gas outlet nozzle as shown in FIG. 3.

According to the present invention, the central pipe 117, 217, 317 ends with a free upper edge 120, 220, 320 in a vertical distance over the top cover 122, 222, 322 of the swirl-inducing inlet device, whereafter the gas is guided into a second compartment 123, 223, 224 of the separator. From the second compartment 123, 223, 323 of the separator, the rotating gas that still contains small liquid droplets, flows into a number of axial flow cyclones 107, 207, 307 for further droplet removal. Separated liquid from the axial flow cyclones is collected in the bottom of a closed compartment 108, 208, 308 surrounding the axial flow cyclones and drained to the drain pipe 104, 204 that preferably is arranged concentrically with the separator. Alternatively, the drain pipe 304 may be arranged outside the separator as shown in FIG. 7. A concentrically arranged drain pipe is preferred because the drain pipe can have a relatively large diameter without disturbing the flow field and thereby reduce the separation performance in the first—and second compartment of the separator. The axial flow cyclone bundle 107, 207, 307 stops the gas swirl, and the gas containing small liquid droplets is evenly distributed to the inlets 111, 211, 311 of the separate axial flow cyclones.

The free space up from liquid surface 119, 219, 319 to the inlet ports 111, 211, 311 of the axial flow cyclones 107, 207, 307 forms the deposition compartment in the separator where liquid droplets coalesce and become deposited on the deposition compartment outer wall 103, 203, 303 and 117, 217, 317 due to the centrifugal forces acting on the liquid droplets. The liquid film formed on the inner wall of the central pipe 117, 217, 317 can pass over the free upper edge 120, 220, 320 and be collected in the open circular void formed by the outer wall of the central pipe 117, 217, 317, the separator inner wall 103, 203, 303 and the sealed top cover 122, 222, 322.

Again with reference to FIGS. 5*a*, 6*a* and 7, it is according to the present invention preferred that liquid collected in the annular open void is guided down to the separator liquid compartment 105, 205, 305 through a drain pipe 114, 214, 314 arranged internally in the separator as shown in FIGS. 5*a* and 6*a*, or externally of the separator as shown in FIG. 7.

The demisting equipment is fixed to a sealed plate 115, 215, 315 isolating a chamber 116, 216, 316 close to the gas outlet from the deposition zone. Above this plate, gas from the separate axial flow cyclones is recollected and guided out through the separators gas outlet nozzle 109, 209, 309 close to the top of the separator. The gas outlet nozzle 109, 209, 309 may also be arranged perpendicularly to the centre-axis of the separator.

Liquid separated in the axial flow cyclones 107, 207, 307 is collected in one or more closed compartments 108, 208, 308 and drained through a manifold system 113, 213, 313 to the aforementioned common drain pipe 104, 204, 304 with large diameter. Alternatively one ore more drain pipes 104, 204, 304 can be directly connected to one or more closed embodiments 108, 208, 308, depending on whether the axial flow cyclones are packed in one ore more closed compartments.

According to known technology, a plate 118, 218, 318, often denoted as a "dollar-plate" is arranged above the liquid surface in order to avoid liquid from being sucked up from the free liquid surface. Furthermore, according to known technology, is has been recommended to utilise vertical baffle plates (not-illustrated) in the liquid compartment to prevent swirl in the separator liquid compartment.

It is preferred, but not necessary to incorporate an area with reduced cross sectional area between the separator inlet nozzle 101, 201, 301 and the liquid surface 119, 219, 319. This feature reduces the pressure at the liquid surface, and thus reduces the backpressure in the drain pipe 104, 204, 304. This is due to the presence of a radial pressure gradient in the separator with highest pressure close to the wall and lowest pressure at the centre axis.

The present invention thus includes all features required to achieve optimum separation performance without introducing new operational problems compared to the state of the art technology:

Centrifugal forces are utilised to remove bulk liquid in the inlet section of the separator, which is much more efficient than utilising gravity alone, i.e. being the case for vane diffuser inlet devices.

At least one following stage of separation is included for removal of remaining droplets from the gas, axial flow cyclones being the most efficient technology for this purpose. This results in an overall improved separation efficiency compared to for instance single stage cyclonic scrubbers.

Any risk of gas breakthrough into the separator liquid compartment is eliminated, a phenomenon that represents the main limitation for inlet cyclone devices of known technology.

Mechanical complicated solutions limiting the separators capacity, as being the case for inlet cyclone devices of known technology, is eliminated. Inlet cyclone devices require one or more channels communicating between the inlet nozzle and the cyclone tubes, which limit the cyclone tube's diameter and/or the number of cyclones that can be fit into the separator. Overall, this gives capacity limitations compared to utilising an arrangement according to the present invention.

The invention claimed is:

1. A vertically oriented separator for separating liquid from a gas stream, said separator comprising
   an inlet nozzle (121,221,321) arranged mainly perpendicularly to the centre axis of the separator and communicating with a circular swirl-inducing inlet device (101, 201,301) being outwardly limited by the separator wall (103, 203,303), inwardly limited by a mainly centrally arranged pipe (117, 217, 317) and upwardly limited by a sealed top cover (122,222,322);
   a first separation compartment (112,212, 312) arranged below the pipe (117,217,317);
   a second separator compartment (123,223,323,) arranged above the pipe (117,217,317), so the incoming fluid successively and under continuous swirl is forced to pass from the circular swirl-inducing inlet device (101, 201,301) to the first separator compartment (112,212, 312) and further through the pipe (117,217,317) to the second separator compartment (123,223,323);
   axial flow cyclones (107, 207, 307) arranged between the second separation compartment (123,223,323) and the separator gas outlet nozzle (109,209,309); and
   one or more drain pipes (104,204,304) for drainage of liquid separated from the gas in the axial flow cyclones.

2. Vertically oriented separator as claimed in claim 1, wherein the drain pipe (104,204,304) is arranged internally or externally of the separator to a liquid compartment (105,205,305) at the bottom of the separator.

3. Vertically oriented separator as claimed in claim 1, wherein the drain pipe (104,204,304) is arranged mainly concentrically with and vertically through the vertically arranged pipe (117,217,317).

4. Vertically oriented separator as claimed in claim 1, wherein the pipe (117,217,317) at its top ends with a free upper edge (120,220,320) in a vertical distance above the top cover (122,222,322), so portions of the liquid film deposited on the inner wall of the pipe (117,217,317) can pass over this free edge (120, 220,320), and be collected in the annular open void formed by the outer wall of the pipe (117,217, 317), the inner wall (103,203,303) of the separator and the top cover (122, 222, 322) of the circular swirl-inducing inlet device.

5. Vertical oriented separator as claimed in claim 4, wherein the liquid collected in the annular open void formed by the outer wall of the pipe (117,217,317), the inner wall (103,203,303) of the separator and the top cover (122,222, 322) of the circular swirl-inducing inlet device, is drained down to the liquid compartment (105, 205,305) at the bottom of the separator through a separate internal drain pipe (114,214), or through a separate external drain pipe (314).

* * * * *